United States Patent
Karch et al.

(10) Patent No.: US 11,969,983 B2
(45) Date of Patent: Apr. 30, 2024

(54) STRUCTURAL COMPONENT

(71) Applicant: Airbus Defence and Space GmbH, Taufkirchen (DE)

(72) Inventors: Christian Karch, Taufkirchen (DE); Blanka Lenczowski, Taufkirchen (DE); Johannes Wolfrum, Taufkirchen (DE); Yehoshua Yeshurun, Taufkirchen (DE)

(73) Assignee: Airbus Defence and Space GmbH, Taufkirchen (DE)

( * ) Notice: Subject to any disclaimer, the term of this patent is extended or adjusted under 35 U.S.C. 154(b) by 7 days.

(21) Appl. No.: 17/494,913

(22) Filed: Oct. 6, 2021

(65) Prior Publication Data

US 2022/0024174 A1    Jan. 27, 2022

Related U.S. Application Data

(63) Continuation of application No. 15/471,795, filed on Mar. 28, 2017, now Pat. No. 11,161,320.

(30) Foreign Application Priority Data

Apr. 8, 2016    (EP) .................................. 16164424

(51) Int. Cl.
    *B32B 5/02*    (2006.01)
    *B29C 70/02*   (2006.01)
    (Continued)

(52) U.S. Cl.
    CPC ............ *B32B 5/022* (2013.01); *B29C 70/021* (2013.01); *B29C 70/885* (2013.01); *B32B 5/26* (2013.01); *B32B 7/04* (2013.01); *B32B 15/08* (2013.01); *B32B 15/14* (2013.01); *B32B 15/18* (2013.01); *B32B 15/20* (2013.01); *B32B 27/12* (2013.01); *B32B 27/308* (2013.01); *B32B 37/14* (2013.01); *B64D 45/02* (2013.01); *B82Y 30/00* (2013.01);
    (Continued)

(58) Field of Classification Search
    CPC ............ B64D 45/02; B32B 5/022; B64C 3/20
    USPC ........................................................ 442/232
    See application file for complete search history.

(56) References Cited

U.S. PATENT DOCUMENTS 7,628,879 B2    12/2009    Ackerman
8,800,911 B2    8/2014     Kruckenberg et al.
(Continued)

FOREIGN PATENT DOCUMENTS

DE    10 2007 057 491 A1    6/2009
EP     3 228 585 B1          8/2019

OTHER PUBLICATIONS

Brown, Alan S. "Sleep on a nanotube sheet." Mechanical Engineering—CIME 130.5 (2008): 20-21. (Year: 2008).*
(Continued)

*Primary Examiner* — Peter Y Choi
(74) *Attorney, Agent, or Firm* — KDW Firm PLLC

(57) ABSTRACT

A structural component for an aircraft, spacecraft or rocket has a ply of fiber reinforced polymer, a first carbon nanotube mat; and a metallic layer, wherein the carbon nanotube mat and the metallic layer are arranged on the ply of fiber reinforced polymer to form a hybrid lightning strike protection layer. A component for manufacturing such a structural component, a method for manufacturing a component of this type, a method for manufacturing a structural component and an aircraft or spacecraft with such a structural component are described.

19 Claims, 4 Drawing Sheets

(51) Int. Cl.

| | |
|---|---|
| B29C 70/88 | (2006.01) |
| B32B 5/26 | (2006.01) |
| B32B 7/04 | (2019.01) |
| B32B 15/08 | (2006.01) |
| B32B 15/14 | (2006.01) |
| B32B 15/18 | (2006.01) |
| B32B 15/20 | (2006.01) |
| B32B 27/12 | (2006.01) |
| B32B 27/30 | (2006.01) |
| B32B 37/14 | (2006.01) |
| B64D 45/02 | (2006.01) |
| B82Y 30/00 | (2011.01) |
| C08J 5/00 | (2006.01) |
| C08J 5/24 | (2006.01) |

(52) U.S. Cl.
CPC .............. *C08J 5/005* (2013.01); *C08J 5/243* (2021.05); *B32B 2250/40* (2013.01); *B32B 2255/02* (2013.01); *B32B 2260/021* (2013.01); *B32B 2260/046* (2013.01); *B32B 2262/106* (2013.01); *B32B 2307/202* (2013.01); *B32B 2307/204* (2013.01); *B32B 2307/212* (2013.01); *B32B 2307/308* (2013.01); *B32B 2307/50* (2013.01); *B32B 2307/546* (2013.01); *B32B 2307/732* (2013.01); *B32B 2571/00* (2013.01); *B32B 2605/18* (2013.01); *C08K 2201/001* (2013.01)

(56) References Cited

U.S. PATENT DOCUMENTS

| | | |
|---|---|---|
| 8,962,130 B2 | 2/2015 | Kruckenberg et al. |
| 11,161,320 B2 | 11/2021 | Karch et al. |
| 2010/0224724 A1 | 9/2010 | Kamino et al. |
| 2010/0227155 A1* | 9/2010 | Bao .................... B29C 70/14 156/196 |
| 2014/0011414 A1 | 1/2014 | Kruckenberg et al. |
| 2016/0031569 A1 | 2/2016 | Karch et al. |
| 2017/0291386 A1 | 10/2017 | Karch et al. |

OTHER PUBLICATIONS

Extended European Search Report for U.S. Appl. No. 16/164,424 dated Oct. 13, 2016.
Gohardani, O., et al., "Potential and prospective implementation of carbon nanotubes on next generation aircraft and space vehicles: A review of current and expected applications in aerospace sciences," Progress in Aerospace Sciences, 70, pp. 42-68, 2014.
European Office Action for Application No. 16164424.0 dated Nov. 19, 2018.
Restriction Requirement for U.S. Appl. No. 15/471,795 dated Apr. 16, 2019.
Non-Final Office Action for U.S. Appl. No. 15/471,795 dated Jul. 11, 2019.
Extended European Search Report for Application No. 19178923.9 dated Oct. 9, 2019.
Final Office Action for U.S. Appl. No. 15/471,795 dated Jan. 17, 2020.
Advisory Action for U.S. Appl. No. 15/471,795 dated Mar. 27, 2020.
European Office Action for Application No. 19178923.9 dated Mar. 31, 2020.
Non-Final Office Action for U.S. Appl. No. 15/471,795 dated May 11, 2020.
Summons to Attend Oral Proceedings for Application No. 19178923.9 dated Oct. 22, 2020.
Final Office Action for U.S. Appl. No. 15/471,795 dated Nov. 4, 2020.
Advisory Action for U.S. Appl. No. 15/471,795 dated Jan. 8, 2021.
Corrected Notice of Allowability and Interview Summary for U.S. Appl. No. 15/471,795 dated Jul. 16, 2021.

\* cited by examiner

STRUCTURAL COMPONENT

CROSS-REFERENCE TO RELATED APPLICATIONS

This application is a continuation of and claims priority to U.S. application Ser. No. 15/471,795 filed Mar. 28, 2017, which claims priority to European Patent Application EP 16 164 424.0 filed Apr. 8, 2016, the entire disclosures of which are incorporated by reference herein.

TECHNICAL FIELD

The present disclosure pertains to a structural component, in particular for an aircraft, spacecraft or rocket. The disclosure herein further pertains to a component for manufacturing such a structural component, a method for manufacturing a component of this type, a method for manufacturing a structural component and an aircraft or spacecraft comprising such a structural component.

Although applicable to any kind of structure that should be protected from lightning and/or electromagnetic pulse, the present disclosure and the problem on which it is based will be explained in greater detail with reference to the fuselage structure of an aircraft, spacecraft or rocket.

BACKGROUND

In fiber reinforced polymer or fiber reinforced plastic structural parts, in particular carbon fiber reinforced plastic (CFRP) or glass fiber reinforced plastic (GFRP), additional lightning strike protection and electromagnetic shielding measures are usually provided.

A known solution for lightning strike protection (LSP) of composites (CFRP and GFRP) airframe structures is a lightning strike protection layer in the form of expanded metallic, in most cases copper foils (ECF). Such expanded metallic/copper foils are generally placed on the top of composite structures. This specific design of a lightning strike protection layer helps to dissipate the lightning strike energy over the surface, e. g. of an airframe component. Since the electrical resistivity of expanded copper foils is significantly larger than that of CFRP/GFRP laminate, the lightning current flows almost completely within the lightning strike protection layer not affecting directly the composite laminate of the composite structure.

Other solutions for lightning strike protection measures known by the applicant are other metallic layers, such as woven wire fabrics, interwoven metallic wires, metal coatings, solid metal foils or conductive and ionisable paints.

In another concept of lightning strike protection measure, a component useful in aircraft and spacecraft vehicles, comprises a resin matrix in which carbon nanotubes are embedded for high conductivity of the component, and an internal layer at which an external layer adjoins. A carbon fiber material is embedded in the resin matrix, which forms the external layer of the component. The internal layer is made of a fiber composite material.

Particularly in aerospace applications, the use of carbon nanotubes (CNT) due to their superior properties for multifunctional applications seems to be very promising. A review about the imminent prospects of utilizing carbon nanotubes due to their superior mechanical, thermal, and electrical properties for multifunctional aircraft and space applications can be found for example in Gohardani, O., et al., "Potential and prospective implementation of carbon nanotubes on next generation aircraft and space vehicles: A review of current and expected applications in aerospace sciences", Progress in Aerospace Sciences, 70, 42, 2014.

The usually used Polyacrylnitril (PAN)-derived carbon fibers in CFRP laminates offer a sufficient high electrical and a reasonable thermal conductivity, but the epoxy matrix is from an electrical point of view an excellent electrical isolator. In case of GFRP structures, the glass fibers are electrically non-conducting. Thus, the general procedure for LSP purposes is to improve the matrix properties, particularly the electrical (and thermal) conductivity, and possibly to network the carbon fibers both within and between the adjacent plies, e.g. using carbon allotropes like carbon nanotubes (CNT). Also, other carbon allotropes like carbon black, short carbon fibers (SCF) or graphene plates may be used.

SUMMARY

In some embodiments, the disclosure herein provides:

A structural component, in particular for an aircraft, spacecraft or rocket, comprising: a ply of fiber reinforced polymer; a first carbon nanotube mat; and a metallic layer, wherein the carbon nanotube mat and the metallic layer are arranged on the ply of fiber reinforced polymer to form a hybrid lightning strike protection layer.

A component for manufacturing a structural component according to the disclosure herein, comprising: a ply comprising fiber material; a metallic layer; and a first carbon nanotube mat, wherein the first carbon nanotube mat and the metallic layer are arranged on the ply.

A method for manufacturing a component according to the disclosure herein, comprising: placing a metallic layer, in particular an expanded copper foil, and a first carbon nanotube mat on a ply comprising fiber material.

A method for manufacturing a structural component, in particular a structural component according to the disclosure herein, comprising:

curing the matrix of a component according to the disclosure herein or manufactured according to a method for manufacturing a component of the disclosure herein such that at least the first carbon nanotube mat and the metallic component are embedded in the cured matrix.

An aircraft, spacecraft or rocket comprising a structural component according to the disclosure herein and/or manufactured according to a method of the disclosure herein.

One idea of the present disclosure is to combine a metallic layer and a carbon nanotube mat (CNT-M) to form a hybrid lightning strike protection (LSP) layer. The hybrid lightning strike protection (LSP) layer also serves as electromagnetic shielding measure.

An LSP measure or LSP layer according to the disclosure herein has the same or even a lower weight than a standard LSP measure/layer. Moreover, mechanical damage of CFRP/GFRP laminates protected by the LSP measure according to the disclosure herein is significantly reduced.

Since CNT-Ms have high electrical conductivity, they contribute to enhanced electrical conductivity in the hybrid lightning strike protection layer. Thus, thermo-mechanical damage of CFRP/GFRP structure is reduced in case of a lightning strike, because the hybrid LSP layer comprising the metallic layer and the CNT-M has lower electrical resistance than, e. g. a metal LSP layer. Therefore, the generated Joule heat is reduced.

Additionally, the CNT-Ms have an outstanding thermal stability, since the melting temperature of CNTs is about 4000° C. and thus much higher than, e. g. that of copper of about 1084° C. Accordingly, the CNT-M may support the metallic layer at very high temperature such that the hybrid protection layer is more thermally-stable than ECF alone and additionally allows energy storage in the form of latent heat. Since the CNT-M reduce the magnitude of Joule heat generated by the lightning strike currents and also have high thermal conductivity, they dissipate the generated heat faster from the lightning strike areas.

In some embodiments, the CNT-M are electro-chemical compatible with CFRP and GFRP materials. They can be easily incorporated with composite structures and are easily paintable. Thus, the CNT-M can replace the usual surfacing film layer and provides similar functionality integrated with the LSP properties. Accordingly, the LSP measure according to one of the ideas of the present disclosure has the same or even lower weight than a standard LSP measure, in particular depending on the surface weight of the metallic layer used.

Additionally, the surface weight of a metallic layer, for example an ECF, can be reduced with the hybrid design. Thus, the hybrid LSP measure/layer will have the same or even lower weight than standard LSP measures/layers, in particular compared to ECF only. However, still an improved electrical conductivity is provided with the hybrid LSP layer according to the disclosure herein.

Finally, since CNT-M are extremely thermally stable, less energy is available for an explosion of the LSP layer. Thus, according to one of the ideas of the present disclosure, mechanical damage of CFRP/GFRP composite structures from lightning is significantly reduced. Accordingly, lightning induced repair and maintenance cost are decreased.

Already available manufacturing processes can be used for the present disclosure. Thus, complexity and cost of manufacturing are not increased. Moreover, already available repair and maintenance processes for lightning strike induced damage can be used as well. Accordingly, additional complexity and cost of manufacturing, repair and maintenance of protected CFRP/GFRP structure are preserved.

To sum up, the hybrid LSP layer according to one of the ideas of the disclosure herein provides for a combination of desired properties and eliminates drawbacks of its single components in a synergetic way.

Generally, the CNT-M can be placed either underneath or on the top of the metallic layer. Furthermore, it is possible to sandwich the metallic layer between two CNT-Ms.

The metallic layer may comprise any industrial metal or metal alloy with sufficiently high conductivity, e. g. comprising copper, nickel, aluminum, brass, bronze, or the like. For special applications, the metallic layer may comprise a metal or metal alloy with high conductivity comprising precious metal, such as e. g. silver.

The method of some embodiments of the present disclosure is variable regarding sequence of its steps. In particular, the step of impregnating may be conducted before or after the step of placement. Furthermore, infiltration or impregnation of the ply and the carbon nanotube mat may be conducted together in one step or separately. In particular, it is possible to use a readily cured ply of fiber reinforced polymer as ply comprising fiber material and firmly bond the carbon nanotube mat and metallic layer thereto by way of curing a matrix of the carbon nanotube mat.

The method of manufacturing a structural component may involve all steps of the method of manufacturing a component for manufacturing a structural component.

Manufacturing a structural component or a (non-cured or not completely cured) component for manufacturing the structural component may be realized by various molding processes, such as among others e. g. Pre-preg, Preforming, RTM (Resin Transfer Molding), Liquid Compression Molding, SMC (Sheet Moulding Compound), RIM (Reaction Injection Molding), BMC (Bulk Molding Compound), Extrusion Compression Molding, Structural Reaction Injection Molding, CFRTP (Carbon Fiber Reinforced Thermo-Plastic) or the like.

A component for manufacturing the structural component may be provided as a semi-finished product in various configurations suitable for the respective molding process, e. g. as a preform or as a prepreg.

After curing, the metallic layer is embedded in the cured matrix on the CNT-M or between two CNT-Ms or between the CNT-M and the ply comprising fiber material.

According to an embodiment of the structural component, the first carbon nanotube mat and the metallic layer are embedded in a matrix. For example, the matrix is a cured polymer resin. In particular the matrix of the ply of fiber reinforced polymer is the matrix in which the first carbon nanotube mat and the metallic layer are embedded. In this case, accordingly, the matrix embeds at least the fibers of the fiber material, the metallic layer and the first carbon nanotube mat. In this way, an integrated design of the structural component with the LSP measure/layer is provided.

According to a further embodiment of the structural component or according to an embodiment of the component for manufacturing the structural component, the hybrid lightning strike protection layer comprises a second carbon nanotube mat. In this case, the metallic layer is arranged between the first carbon nanotube mat and the second carbon nanotube mat. Accordingly, the metallic layer is sandwiched between the first and second CNT-M. In this way, improved thermal stability is achieved, since the CNT-Ms structurally support the metallic layer from both sides under very high temperature conditions.

According to a further embodiment of the structural component, the first carbon nanotube mat is arranged on the ply of fiber reinforced polymer. Accordingly, the first carbon nanotube mat is arranged on the ply comprising fiber material in an embodiment of a component for manufacturing the structural component. Thus, the metallic layer is arranged on the first carbon nanotube mat. In case a second carbon nanotube mat is provided, the metallic layer is for example arranged between the first and second carbon nanotube mats. Alternatively or in addition, a dielectric coating or paint can be arranged on the second carbon nanotube mat. In this way, the CNT-M can replace conventional surfacing film layers and thus offers the same functionality as the surfacing film layer plus its LSP function in an integral way. Furthermore, a conventional veil can be omitted. Therefore, the hybrid LSP layer advantageously has low weight, in particular lower weight compared to conventional LSP measures.

According to an embodiment of the component for manufacturing the structural component, at least the first carbon nanotube mat is impregnated with a non-cured matrix. For example, the component is configured as a prepreg component. Other parts of the component may also be impregnated. In an embodiment, also the ply comprising fiber material and/or a second carbon nanotube mat is impregnated with the non-cured matrix. In this way, a pre-product or semi-finished product, in particular a prepreg or preform, is provided which, in particular independently, allows finishing the manufacturing of a structural component by curing.

According to a further embodiment of the structural component or according to an embodiment of the component for manufacturing the structural component, the metallic layer comprises copper. In this way, the properties of the CNT-M are ideally added with the high conductivity of copper to advantageously provide for minimum effective electrical resistance. Optionally or in addition, the metallic layer is configured as an expanded metallic foil. In this way, a low surface weight and high extensive expansion of the metallic layer is provided. In another embodiment, the metallic layer comprises or is configured as an expanded copper foil.

According to a further embodiment of the structural component or according to an embodiment of the component for manufacturing the structural component, the first carbon nanotube mat is configured as non-woven carbon nanotube mat. Additionally, also the second carbon nanotube mat may be configured as non-woven carbon nanotube mat. Non-woven carbon nanotube mats provide for a large size, are easy to handle and flexible. Furthermore, the CNTs don't need to be dispersed. In particular, the CNT-M is made of 100% CNTs, meaning pure CNT fabric. Thus it easily and cost-effectively can be impregnated with a resin using custom industrial techniques. Since the non-woven CNTs in the mat have a high aspect ratio (~1:100,000), improved electrical, thermal and mechanical properties are provided.

According to an embodiment of the method for manufacturing a component, the method further comprises a step of impregnating at least the first carbon nanotube mat with a non-cured matrix. In this way, the component can be manufactured as a prepreg component. Other parts of the component may also be impregnated simultaneously or in sequence. In an embodiment, also the ply comprising fiber material and/or a second carbon nanotube mat is impregnated with the non-cured matrix. In this way, a pre-product or semi-finished product, in particular a prepreg, is manufactured which, in particular independently, allows finishing the manufacturing of a structural component by curing.

According to an embodiment of the method for manufacturing a component or according to an embodiment of the method for manufacturing a structural component, the first carbon nanotube mat, the metallic layer and the ply are impregnated with the matrix together. In this way, an integrated manufacturing process, in particular with only one impregnation step, is provided.

Furthermore, according to an embodiment of the method for manufacturing a structural component, the first carbon nanotube mat, the metallic layer and the ply are embedded together in the cured matrix. In this way, an LSP layer for a structural component can be manufactured in an integrated and labor-saving process with conventional tooling. Accordingly, manufacture is possible with low complexity and thus at low cost.

According to an embodiment of manufacturing the component or according to an embodiment of the method for manufacturing a structural component, placing the metallic layer and the first carbon nanotube mat on the ply comprises the steps of placing the first carbon nanotube mat on the ply; placing the metallic layer on the first carbon nanotube mat; and placing a second carbon nanotube mat on the metallic layer. In this way, an LSP-layer with double CNT-M enclosing the metallic layer, for example an ECF, is provided. In this way, the hybrid LSP layer is provided with improved thermal stability.

According to yet another embodiment of the method of manufacturing the prepreg component or according to an embodiment of the method for manufacturing a structural component, the method further comprises the step of coating the second carbon nanotube mat with a dielectric coating or paint. In particular, the coating or paint is applied directly on the second carbon nanotube mat. In this way, advantageously, a conventional surfacing film and/or a conventional veil can be omitted. The dielectric coating or paint may be applied before or after curing of the matrix.

According to an embodiment of an aircraft or spacecraft, the structural component forms part of a skin of the aircraft or spacecraft. In this way, advantageously, an effective lightning strike protection (LSP) measure is provided in the aircraft or spacecraft.

The above embodiments may be combined in any reasonable way. In particular, features of the prepreg component are applicable to the structural component and vice versa. Furthermore, features of the method for manufacturing a prepreg component are applicable to the method for manufacturing the structural component and vice versa.

The disclosure herein will be explained in greater detail with reference to exemplary embodiments depicted in the drawings as appended.

BRIEF DESCRIPTION OF THE DRAWINGS

The accompanying drawings are included to provide a further understanding of the present disclosure and are incorporated in and constitute a part of this specification. The drawings illustrate the embodiments of the present disclosure and together with the description serve to explain the principles of the disclosure herein. Other embodiments of the present disclosure and many of the intended advantages of the present disclosure will be readily appreciated as they become better understood by reference to the following detailed description. The elements of the drawings are not necessarily to scale relative to each other. In the figures, like reference numerals denote like or functionally like components, unless indicated otherwise.

It will be appreciated that common and/or well understood elements that may be useful or necessary in a commercially feasible embodiment are not necessarily depicted in order to facilitate a more abstracted view of the embodiments. It will further be appreciated that certain actions and/or steps in an embodiment of a method may be described or depicted in a particular order of occurrences while those skilled in the art will understand that such specificity with respect to sequence is not actually required. It will also be understood that the terms and expressions used in the present specification have the ordinary meaning as is accorded to such terms and expressions with respect to their corresponding respective areas of inquiry and study, except where specific meanings have otherwise been set forth herein.

Although specific embodiments are illustrated and described herein, it will be appreciated by those of ordinary skill in the art that a variety of alternate and/or equivalent implementations may be substituted for the specific embodiments shown and described without departing from the scope of the present disclosure. Generally, this application is intended to cover any adaptations or variations of the specific embodiments discussed herein.

DETAILED DESCRIPTION

Figure 1:
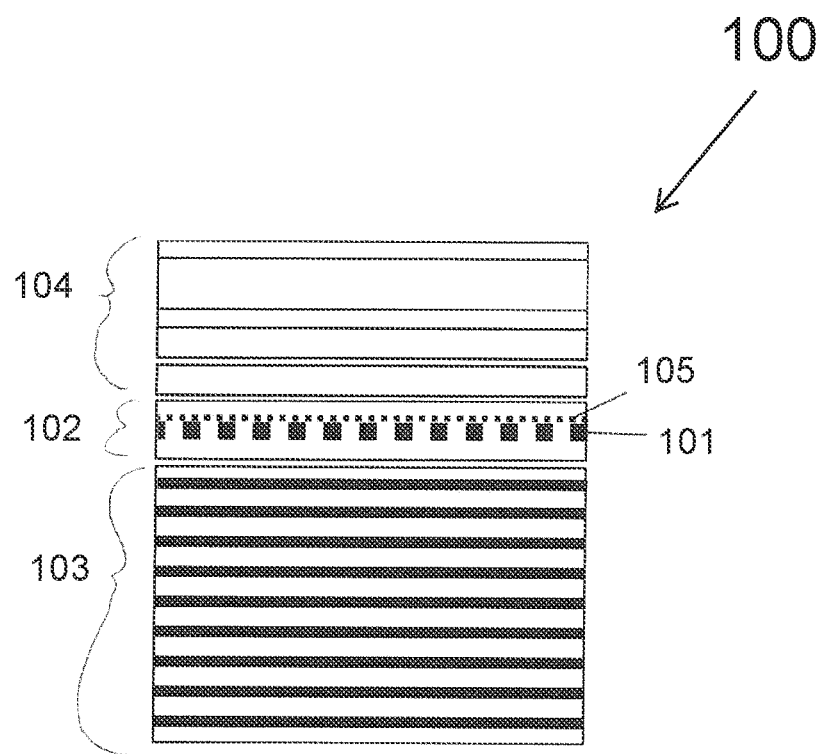
FIG. 1 schematically illustrates an exemplary sectional view of lightning strike protection measures of an airframe component.

FIG. 1 schematically illustrates a sectional view of lightning strike protection of an airframe component.

In FIG. 1, reference sign 102 denotes a lightning strike protection layer placed on the top of a composite structure 100. The lightning strike protection layer 102 comprises e.g. an expanded copper foil 101 placed on the top of the composite laminate 103 but underneath protective dielectric coatings (e.g. paint layers) 104.

A veil 105 (combined with an epoxy resin surfacing film) is placed on the top of ECF 101 in order to decrease the surface roughness and to prepare the surface for the final varnish that is for example made up of several layers, as shown in FIG. 1.

Figure 2:
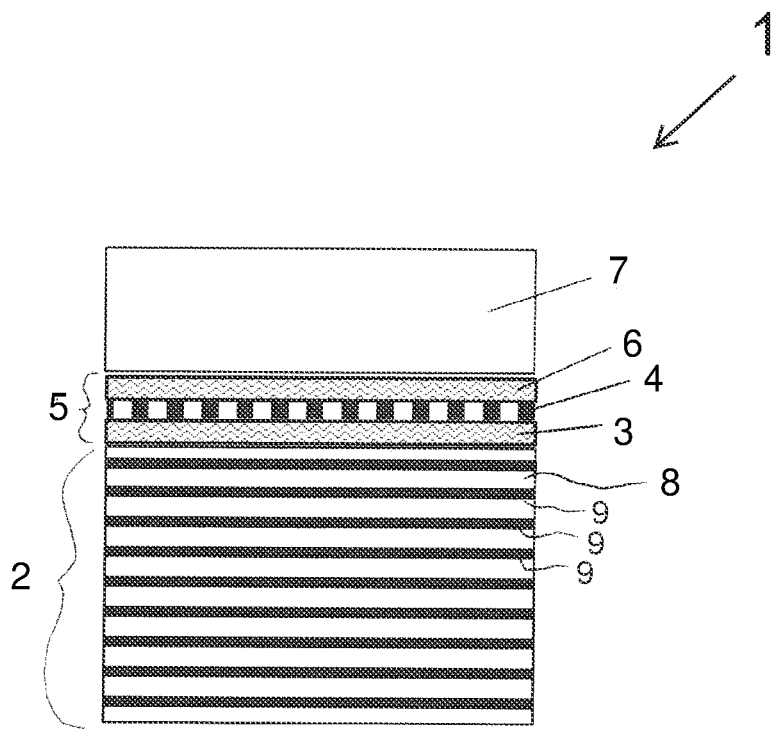
FIG. 2 shows a schematic sectional view of a structural component.

FIG. 2 shows a schematic sectional view of a structural component 1.

The structural component 1 comprises a ply 2 of fiber reinforced polymer material, which comprises a matrix 8 and a plurality of carbon fibers 9. The structural component e. g. forms a carbon fiber reinforced polymer or carbon fiber reinforced plastic (CFRP) fuselage component of the skin 11 of an aircraft 10. The ply 2 of fiber reinforced polymer material thereby forms the structural basis of the structural component 1.

It is to be understood that FIG. 2 schematically shows the arrangement of layers of the structural component at an outer side, which may form the outer skin of an aircraft at any section thereof.

On the outer side of the ply 2 of fiber reinforced polymer, a hybrid lightning strike protection (LSP) layer 5 is arranged. The hybrid LSP layer 5 comprises first and second non-woven carbon nanotube mats (CNT-M) 3, 6 and a metallic layer 4 configured as expanded copper foil (ECF).

Carbon nanotubes (CNT) generally are cylindrical shaped carbon forms with nanometric diameters. In particular, they have a hollow structure with walls made of graphite or of graphene (a hexagonal structure made of carbon atoms).

Non-woven carbon nanotube mats (CNT-M) can be manufactured e. g. by way of a gas-phase catalytic reaction creating a dense cloud of very long carbon nanotubes. These can be collected, for example spun around a drum, to create a non-woven mat. Such non-woven carbon nanotube mats are manufactured e.g. by Tortech Nano fibers Ltd., Israel or Nanocomp Technologies Inc., USA.

An expanded copper foil (ECF) may be made from a continuous expansion of copper, e. g. by rolling. It can be provided with different surface weights, depending on the number and thickness of CNT-M in the hybrid lightning strike protection layer 5.

In the embodiment of FIG. 2, the first CNT-M 3 is arranged on the ply 2 of CFRP. Furthermore, a metallic layer 4 and a second carbon nanotube mat 6 are arranged on the first carbon nanotube mat 3. Accordingly, the metallic layer 4 is sandwiched between the first and second carbon nanotube mats 3, 6.

The first and second carbon nanotube mats 3, 6 and the metallic layer 4 there between are completely embedded in the cured matrix 8 of the ply 2 of fiber reinforced polymer material. Therefore, the hybrid LSP layer is firmly bonded to the CFRP-ply 2 in an integrated way.

Additionally, the structural component 1 is covered with a dielectric coating 7, which is arranged directly on the outer side of the second carbon nanotube mat 6.

Figure 3:
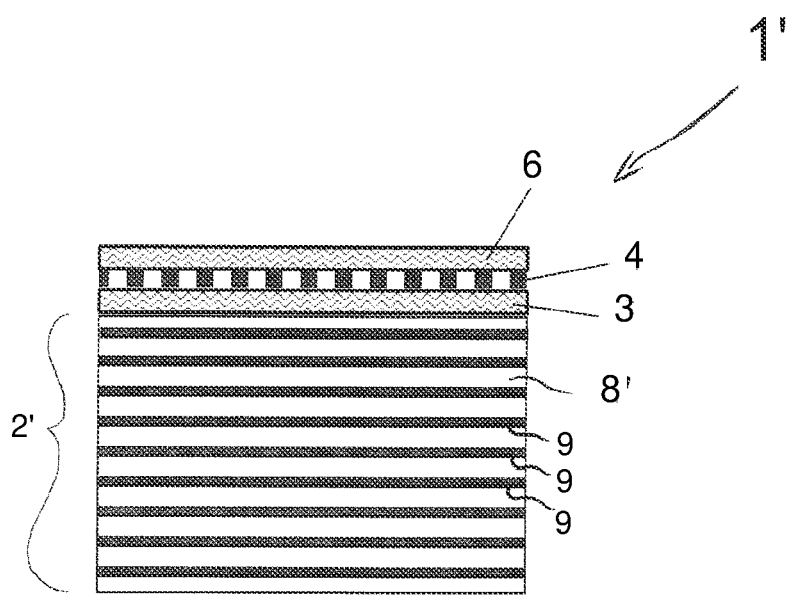
FIG. 3 shows a schematic sectional view of a prepreg component.

FIG. 3 shows a sectional view of a prepreg component.

The prepreg component is a component 1' for manufacturing a structural component 1 according to FIG. 2 by curing. Therefore, the prepreg component 1' comprises a ply 2' comprising a fiber material. The first carbon nanotube mat 3, the metallic layer 4 and the second carbon nanotube mat 6 are arranged on the ply in the order as described with reference to FIG. 2. However, the dielectric layer is not yet applied.

The ply 2', the first carbon nanotube mat 3, the metallic layer 4 and the second carbon nanotube mat 6 are impregnated with a non-cured matrix 8'.

For manufacturing the prepreg component, the first carbon nanotube mat 3 is placed on the ply 2'. Further, the metallic layer 4 is placed on the first carbon nanotube mat 3 and the second carbon nanotube mat 6 is placed on the metallic layer 4. The complete component is then impregnated with a non-cured matrix 8', which is e. g. a duroplastic/thermoset resin. This means, the ply 2', the first carbon nanotube mat 3, the metallic layer 4 and the second carbon nanotube mat 6 are all impregnated with the non-cured matrix 8' together to form the prepreg component 1'.

For manufacturing a structural component 1 according to FIG. 2, the matrix 8' of the prepreg component 1' is cured such that the ply comprising fiber material, the first carbon nanotube mat 3, the metallic component 4 and the second carbon nanotube mat are embedded in the cured matrix 8 and thus firmly bonded with each other.

Finally, the outer side of the second carbon nanotube mat 6 is coated with a dielectric coating 7.

Figure 4:
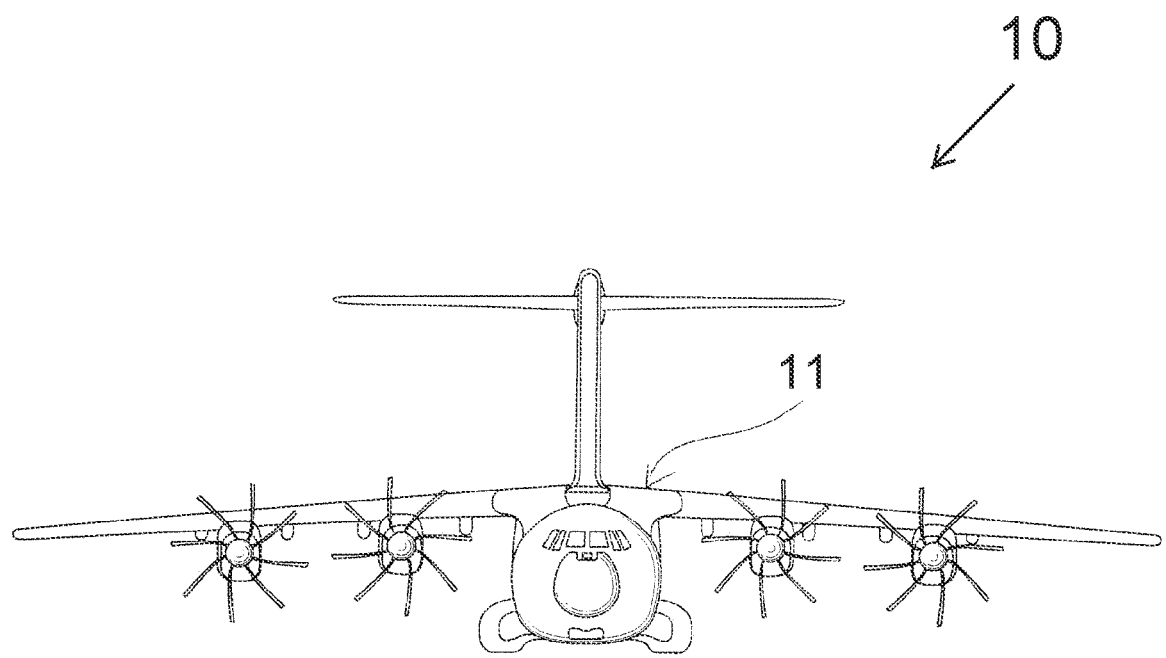
FIG. 4 shows a front view of an exemplary aircraft.

FIG. 4 shows a front view of an exemplary aircraft 10. The aircraft 10 comprises a skin 11, part of which is formed as a structural component 1 according FIG. 2.

Accordingly, the aircraft (10) comprises a hybrid lightning strike protection (LSP) measure comprising an expanded copper foil (ECF) and a CNT non-woven mat (CNT-M).

Although specific embodiments of the disclosure herein are illustrated and described herein, it will be appreciated by those of ordinary skill in the art that a variety of alternate and/or equivalent implementations exist. It should be appreciated that the exemplary embodiment or exemplary embodiments are examples only and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

For example, it is not ultimately necessary to provide a second CNT non-woven mat. The hybrid lightning strike protection layer generally may also work with one CNT-M only, depending on the layout thereof. Accordingly, the CNT-M or even a plurality of CNT-M can be placed either underneath or on top of the metallic layer or ECF.

Additionally, the metallic layer does not necessarily have to consist of or comprise an ECF, but may have either alternative or additional other elements. In particular, the disclosure herein also covers other metals or alloys, e. g. nickel, aluminum, iron, brass, bronze or the like. For special applications, the metallic layer may comprise a metal or metal alloy with high conductivity comprising precious metal, such as e. g. silver. Furthermore, other kinds of layers then an expanded foil, e.g. an electrolytic foil, a grid (e. g. a wire grid or a stamped grid), or the like may be used.

Furthermore, the method for manufacturing the component or the structural component does not necessarily have to comprise a step of impregnation of the ply comprising fiber material. The ply may also be provided as already cured ply, e. g. of CFRP or GFRP, and only the hybrid lightning strike protection layer, meaning at least the first CNT-M and the metallic layer, are firmly bonded thereto, e. g. by impregnation and curing.

It will also be appreciated that in this document the terms "comprise", "comprising", "include", "including", "contain", "containing", "have", "having", and any variations thereof, are intended to be understood in an inclusive (i.e. non-exclusive) sense, such that the process, method, device, apparatus or system described herein is not limited to those features or parts or elements or steps recited but may include other elements, features, parts or steps not expressly listed or inherent to such process, method, article, or apparatus. Furthermore, the terms "a" and "an" used herein are intended to be understood as meaning one or more unless explicitly stated otherwise. Moreover, the terms "first", "second", "third", etc. are used merely as labels, and are not intended to impose numerical requirements on or to establish a certain ranking of importance of their objects.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A structural component for an aircraft, spacecraft or rocket, comprising:
   a ply of fiber reinforced polymer;
   a non-woven carbon nanotube mat consisting of carbon nanotubes; and
   an expanded metallic foil layer,
   wherein the non-woven carbon nanotube mat and the expanded metallic foil layer are arranged on the ply of fiber reinforced polymer to form a hybrid lightning strike protection layer, wherein the non-woven carbon nanotube mat is configured to structurally support the expanded metallic foil layer to enhance a thermal stability of the expanded metallic foil layer.

2. The component of claim 1, wherein the non-woven carbon nanotube mat and the expanded metallic foil layer are embedded in a matrix.

3. The component of claim 1, wherein the non-woven carbon nanotube mat and the expanded metallic foil layer are embedded in a matrix of the ply of fiber reinforced polymer.

4. The component of claim 1, wherein the expanded metallic foil layer comprises copper.

5. The component of claim 1, wherein the expanded metallic foil layer is configured as an expanded copper foil.

6. A component for manufacturing a structural component, having a hybrid lightning strike protection layer, wherein the component comprises:
   a ply comprising fiber material;
   an expanded metallic foil layer;
   a non-woven carbon nanotube mat consisting of carbon nanotubes,
   wherein the non-woven carbon nanotube mat and the expanded metallic foil layer are arranged on the ply and are configured to be integrated together to form a hybrid lightning strike protection layer, wherein the non-woven carbon nanotube mat is configured to structurally support the expanded metallic foil layer to enhance a thermal stability of the expanded metallic foil layer.

7. The component of claim 6, wherein at least the non-woven carbon nanotube mat is impregnated with a non-cured matrix.

8. A method for manufacturing a component for manufacturing a structural component having a hybrid lightning strike protection layer, comprising:
   providing a ply comprising fiber material;
   providing a non-woven carbon nanotube mat consisting of carbon nanotubes;
   providing an expanded metallic foil layer, wherein the non-woven carbon nanotube mat and the expanded metallic foil layer are configured to be integrated together to form a hybrid lightning strike protection layer; and
   arranging the expanded metallic foil layer and the non-woven carbon nanotube mat on the ply comprising fiber material, wherein the non-woven carbon nanotube mat is configured to structurally support the expanded metallic foil layer to enhance a thermal stability of the expanded metallic foil layer.

9. The method of claim 8, wherein the expanded metallic foil layer is configured as an expanded copper foil.

10. The method of claim 8, further comprising a step of impregnating at least the non-woven carbon nanotube mat with a non-cured matrix.

11. A method for manufacturing a structural component having a hybrid lightning strike protection layer, wherein the method comprises:
    providing a ply comprising fiber material;
    providing an expanded metallic foil layer;
    providing a non-woven carbon nanotube mat consisting of carbon nanotubes, wherein at least the non-woven carbon nanotube mat is impregnated with a non-cured matrix;
    arranging the metallic layer and the non-woven carbon nanotube mat on the ply comprising fiber material, wherein the non-woven carbon nanotube mat is configured to structurally support the metallic layer to enhance a thermal stability of the metallic layer; and
    curing the matrix such that at least the non-woven carbon nanotube mat and the metallic layer are embedded in the cured matrix.

12. The method of claim 11, wherein the expanded metallic foil layer is configured as an expanded copper foil.

13. The method of claim 11, wherein the non-woven carbon nanotube mat, the expanded metallic foil layer and the ply are impregnated with the matrix together.

14. The method of claim 11, wherein the non-woven carbon nanotube mat, the expanded metallic foil layer and the ply are embedded together in the cured matrix.

15. An aircraft, spacecraft or rocket comprising a structural component comprising:
    a ply of fiber reinforced polymer;
    a non-woven carbon nanotube mat consisting of carbon nanotubes; and an expanded metallic foil layer,
wherein the non-woven carbon nanotube mat and the expanded metallic foil layer are arranged on the ply of fiber reinforced polymer to form a hybrid lightning strike protection layer, wherein the non-woven carbon nanotube mat is configured to structurally support the expanded metallic foil layer to enhance a thermal stability of the expanded metallic foil layer.

16. The component of claim 15, wherein the non-woven carbon nanotube mat and the expanded metallic foil layer are embedded in a matrix.

17. The component of claim 15, wherein the non-woven carbon nanotube mat and the expanded metallic foil layer are embedded in a matrix of the ply of fiber reinforced polymer.

18. The component of claim 15, wherein the expanded metallic foil layer comprises copper.

19. The component of claim 15, wherein the expanded metallic foil layer is configured as an expanded copper foil.

* * * * *